Dec. 3, 1968
L. A. M. PHELAN ET AL
3,413,912
FOOD BROILER
Filed Feb. 12, 1968
2 Sheets-Sheet 1
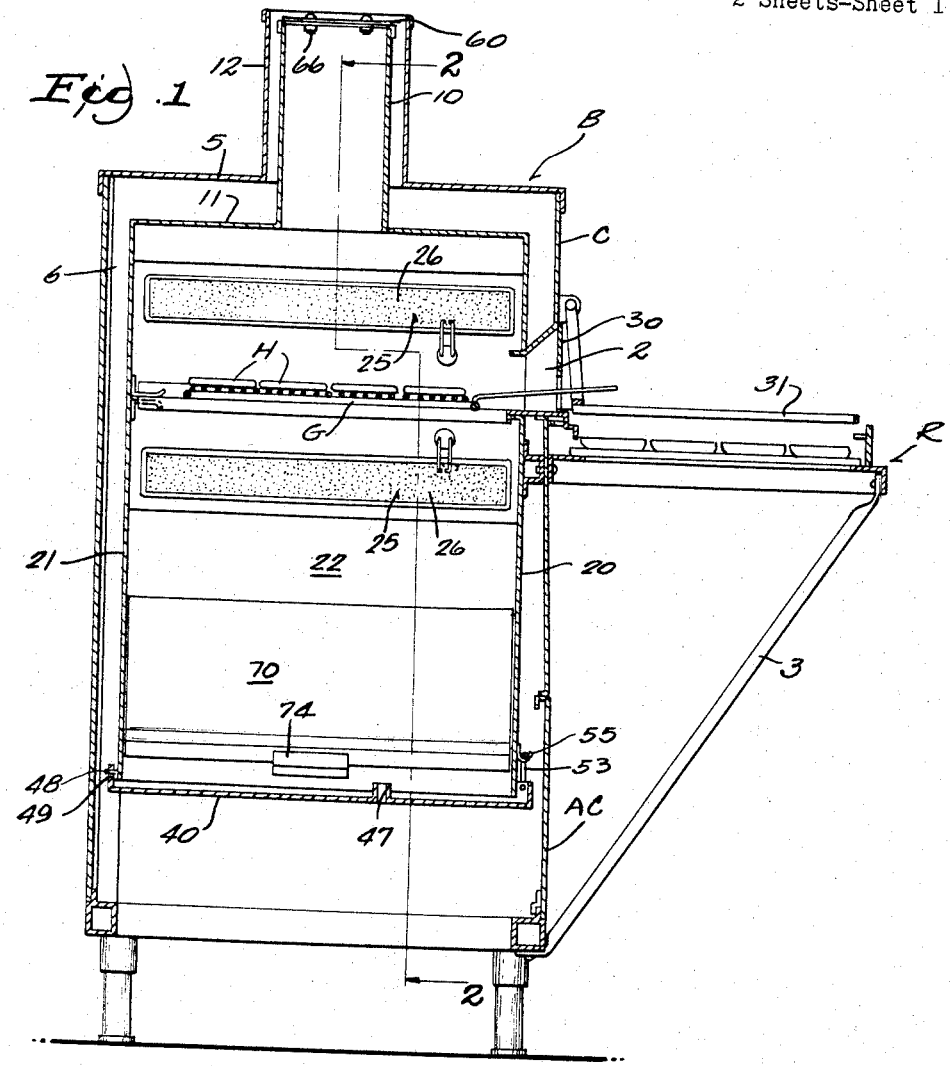
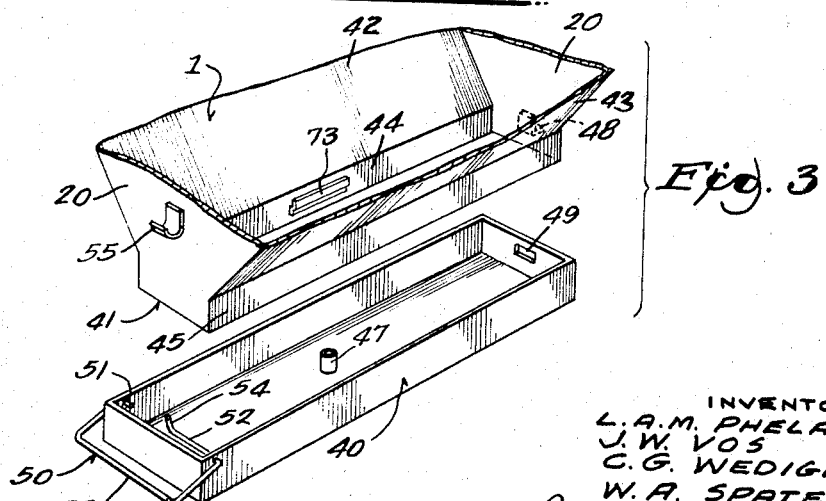
INVENTORS:
L. A. M. PHELAN
J. W. VOS
C. G. WEDIGE
W. A. SPATES
BY: James E. Nilles
ATTORNEY

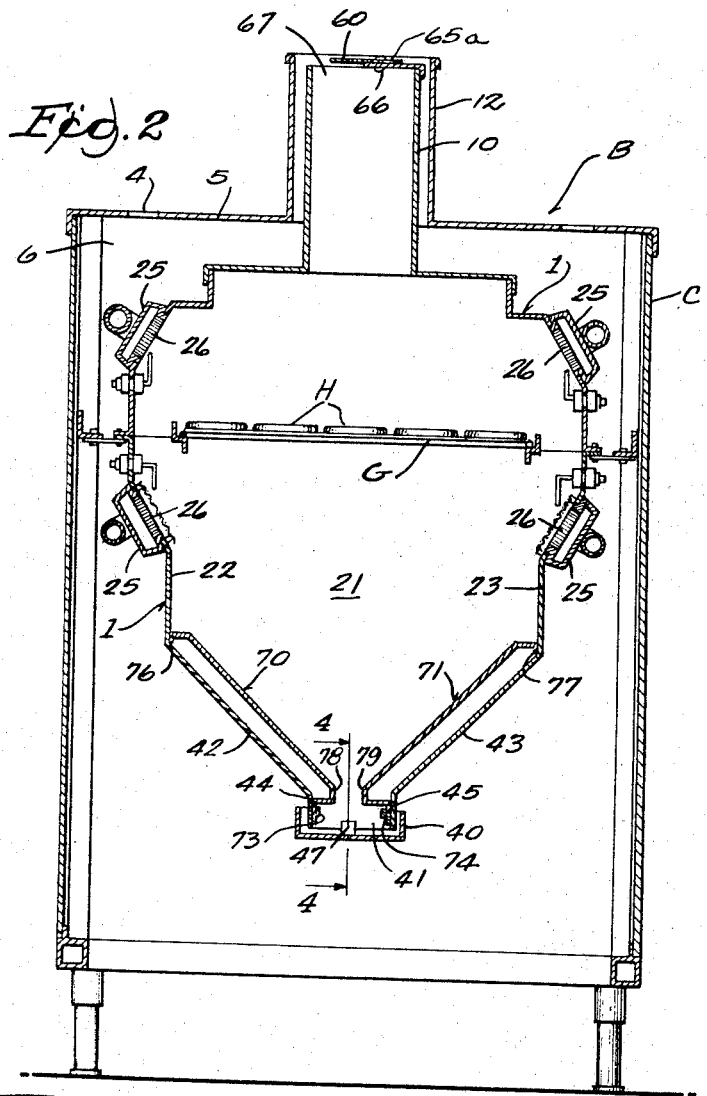
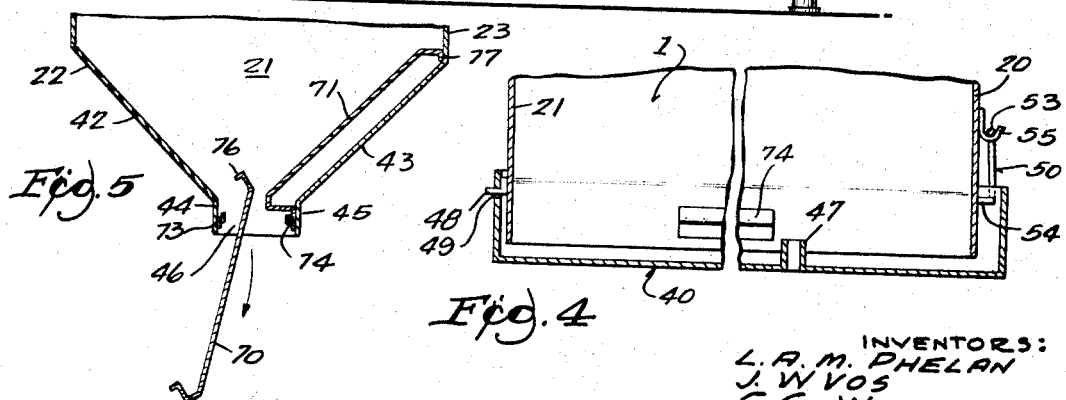

United States Patent Office 3,413,912
Patented Dec. 3, 1968

3,413,912
FOOD BROILER
Louis A. M. Phelan, Roscoe, Ill. 61073; John W. Vos, Roscoe, Ill., and Cyril G. Wedige and William A. Spates, Beloit, Wis.; said Wedige, said Vos, and said Spates assignors to said Phelan
Filed Feb. 12, 1968, Ser. No. 704,828
7 Claims. (Cl. 99—400)

ABSTRACT OF THE DISCLOSURE

A food broiler of the type utilizing infra-red heat generating units in its broiler chamber, which chamber is substantially sealed against the entry of excess air. The chamber has a quick detachable pan at the bottom for catching hot fat. The pan can be locked in position, yet readily removed from one end of the broiler.

Background of the invention

The invention relates to food broiling apparatus in which the food to be broiled is subjected to intense radiant heat and the cooking chamber is closely controlled as to air content to prevent charring of the food. Such a process is disclosed and claimed in the U.S. patent to two of the present inventors, L. A. M. Phelan and John W. Vos, Number 2,945,767, issued July 19, 1960, and the apparatus is claimed in their U.S. Patent Number 2,997,941 issued Aug. 29, 1961.

The present invention finds particular utility in quick-order food serving establishments, such as "drive-ins," where many hamburgers, for example, must be prepared in a very short period of time. Heretofore, considerable inconvenience was involved in disengaging and engaging the fat pan, as it was necessary to work on it in inaccessible or awkward locations, and the pan contents would sometimes be spilled.

It was also difficult to clean this broiler, particularly at the lower, internal portion thereof.

Summary of the present invention

The present invention provides a broiler of the infra-red heat type having a fat trap pan at the bottom of its broiling chamber wherein a novel locking means is provided for this removable fat trap pan. This means insures against inadvertent unlocking or dislodging of this pan which contains molten fat, and the arrangement is such that the pan and its contents also seal the bottom of the broiler against the entry of air.

Another aspect of the invention relates to such a broiler having chamber wall panels that can be easily placed in position and can be easily removed through the bottom of the chamber after the fat pan has been removed, and they also prevent excessive heating of the fat.

These and other objects and advantages of the present invention will appear hereinafter as this disclosure progresses, reference being had to the accompanying drawings.

Brief description of the drawings

FIGURE 1 is a side elevational view, in section, of a broiler embodying the invention and showing the fat trap pan in place;

FIGURE 2 is a front elevation view, in section, of the broiler, the view taken generally along the line 2—2 in FIGURE 1;

FIGURE 3 is an enlarged, exploded, perspective view of the lower end of the broiling chamber and the fat pan;

FIGURE 4 is a fragmentary, enlarged view of the fat pan and the lower end of the broiler as shown in FIGURE 1; and FIGURE 5 is a fragmentary view of the lower end of the broiler as shown in FIGURE 2, but showing the fat pan removed and one of the panels being removed through the lower end of the broiler.

Description of the preferred embodiments

The general construction and arrangement of the broiler B includes a generally rectangular outer casing C which encloses and supports the broiler chamber 1. A horizontal rack mechanism R extends from the front side of the broiler and is located adjacent and slightly below the loading and unloading opening 2 of the chamber. Supports 3 extend between the lower portion of the casing and the outer end of the rack so as to rigidly support the latter. Openings 4 are located in the top 5 of the casing for the purpose of permitting heat to escape from the space 6 between the casing and chamber.

The chamber 1 has an exhaust duct 10 extending upwardly from its top side 11 so as to permit gases of combustion and heat to be exhausted from the broiling area within the chamber 1. A chimney 12 extends upwardly from the top 5 of the casing C and surrounds the exhaust duct 10 to thereby permit heat to escape from the space 6 between the casing and chamber 1.

Referring in greater detail to the drawings, the chamber also includes a vertical front wall 20, a vertical rear wall 21, side wall 22 and another side wall 23. The side walls 22 and 23 each have a pair of gas fired, radiant heat burners 25. Each burner 25 includes a ceramic face 26 containing a multitude of small holes through which a mixture of gas and air pass and is then ignited at the surface of the ceramic face to create an intense infra-red type of heat. These burners are conventional and extend substantially along the entire length of the wall on which they are mounted. Such an arrangement is shown in the U.S. Patent 3,267,924 which issued on Aug. 23, 1966, to T. C. Payne and which has been assigned to an assignee common to the present application.

At the front of the broiler, a horizontal opening 2 is formed in the chamber front 20 and also in the casing so that a grill G can be loaded with food, such as hamburgers H, and slid into the broiling chamber 1.

The flow and amount of air in the broiler must be closely controlled and restricted so as to prevent food charring at the high temperatures involved.

A door 30 is secured to a frame 31 for swinging therewith and is adapted to close opening 2 when the frame is lowered to the broiling position as shown in FIGURE 1.

As the meat is broiled, a certain amount of fat drips therefrom and collects in the pan 40 which is quickly removable from the lower, reduced end 41 of the chamber 1. The chamber has downwardly converging side portions 42, 43 which then terminate in the parallel, vertical portions 44, 45. Thus the lower end of the chamber is formed as a rectangular opening 46 which is defined by portions 44, 45 and front and rear walls 20 and 21. This opening 46 is sealed by the accumulation of fat in the pan, the level of which fat rises about the lower end of the chamber, and as determined by the overflow nipple 47 which permits excess fat to drip into a container (not shown).

As taught in the previously mentioned Patents 2,945,767 or 2,997,941, water may also be conducted into the pan to maintain the level of the air sealing liquid in the pan.

It is necessary to remove the pan on occasions for emptying and/or cleaning thereof and means have been provided for doing so from the front end of the machine, specifically through the removable access panel AC. As shown best in FIGURES 3 and 4, the lower end of the rear wall 21 has an extending projector 48 over which a complementary opening 49 in the rear end of the pan is adapted to be slipped. In order to disengage this connection, it is necessary to shove the pan in a rearward direction. Means are provided at the front end of the pan and chamber, which area is easily accessible to the operator, for insuring that such rearward movement of the pan cannot occur accidentally to spill the contents. For this purpose, a locking handle 50 is swingably mounted, by its inwardly extending ends 51 and 52, in the sides of the front end of the pan. The handle also has a front portion 53 for firm grasping by the operator. The handle also includes an extension 54 which is formed generally at a right angle to the front portion, which extension abuts against the front wall of the chamber when the front portion 53 is flat against the pan and engaged on a hook 55 fixed on the front end of the chamber. When in this locking position (FIGURE 4), the extension 54 holds the pan forwardly, and in this locked position the rear end of the pan is securely held on projection 48.

*Adjustable duct*

With the bottom of the chamber sealed, and with the door 30 which closes the loading opening 2, the chamber is substantially sealed against the entry of excess air. In order to prevent smoke or gas from coming out of the chamber, for instance through the cracks surrounding the door, the effectiveness of or amount of draft of the duct 10 is such so as to nicely balance any air movement in the chamber. In other words, the duct is sized, as to both cross-sectional area and height, to provide for a reduction of pressure in the chamber by relieving the pressure therein. In other words, the duct sucks the chamber to place a slight suction on the burners, which in turn make the burners draw in slightly more air than otherwise. This creates a condition that makes the burners function properly, that is, they burn more completely.

These broilers are often used in rooms under ventilating hoods of different drawing capacities and therefore the duct can be adjusted as to cross-section to provide for the above mentioned balance of draft, or negative pressure within the chamber. For this purpose, an adjustable louver or baffle 60 has slots 65a (FIGURE 2) and is slidable and adjustably secured by screws 66 to and across the top of the duct 60 so that only enough air and products of combustion will pass upwardly through the open portion 67 to permit proper action of the burners and account for the small leakage of other air into the chamber.

*Removable chamber panels*

In order to facilitate cleaning of the interior of the broiler, particularly as to the fat which would drip on the inclined wall portions 42 and 43, removable panels 70 and 71 are inserted over their respective walls 42 and 43 and can be easily inserted and removed. This is accomplished by securing a bracket 73 and 74 (FIGURE 2) on the inner surface of broiler walls 42 and 43 into which the lower edges of panels 70 and 71 can be readily inserted. The upper edges 76 and 77 of the panels 70 and 71 simply rest against the inside of the chamber walls, thereby completely covering these inclined walls from fat drippings. These panels can then be removed from the bottom of the chamber in an easy manner, it only being necessary to remove the fat pan 40, then reach in and lift the panels off their brackets 73, 74 and then withdraw them downwardly through the open lower end of the chamber.

These baffles or panels 70 and 71 also function to prevent excessive heating of the fat in the pan 40. They do this because their lower, adjacent edges 78, 79 (FIGURE 2) project toward one another and are thus close together and act to reduce the area of the pan which is exposed to the radiant heat. The panels also insulate and prevent the walls 42 and 43 from becoming heated excessively and conducting the heat downwardly into the fat in the pan.

We claim:

1. A food broiler having a broiling chamber which is closable against the entry of excess air, infra-red heat generating units in said chamber for subjecting meat therein to intense radiant heat so as to cause fat to drip therefrom, said chamber having front and back ends and an opening at the bottom of said chamber, a pan having a front and back end, said pan being connected to the bottom of said chamber and over said opening for catching fat dripping from said meat, and means for quickly locking and unlocking said pan over said opening and operable from the front end thereof, said means comprising, interengageable elements between and adjacent the rear ends of said chamber and pan and disengageable by rearward shifting of said pan, said means also including a handle swingably mounted on the front end of said pan and having an extension thereon, said handle being swingable from (1) a locking position in which said extension abuts against the front end of said chamber to prevent rearward shifting of said pan and (2) a position in which said extension is free of contact with said chamber to thereby permit rearward shifting of said pan and consequent disengagement of said interengageable elements.

2. The broiler as described in claim 1 further characterized in that said interengageable elements are a projection and a slot.

3. The broiler defined in claim 2 further characterized in that said projection and slot are located on the rear ends of said pan and chamber.

4. A food broiler having a broiling chamber which is closable against the entry of excess air, infra-red heat generating units in said chamber for subjecting meat therein to intense radiant heat so as to cause fat to drip therefrom, said chamber having front and back ends and generally downwardly converging side walls, said ends and walls at their lower ends defining an opening at the bottom of said chamber, a pan disengageably connected to the bottom of said chamber and over said opening for catching fat dripping from said meat, a panel removably positionable over each of said converging side walls and generally co-extensive therewith, said panels adapted to prevent hot fat from falling on said side walls and cause said fat to run in said pan, and bracket means for detachably holding said panels in position over said walls and permitting removal of said panels downwardly through said opening when said pan is removed.

5. A broiler as defined in claim 4 further characterized in that said bracket means is secured to said side walls adjacent the bottom end thereof and said panels can be slipped downwardly therein, said panels adapted to abut against said walls adjacent the upper end of said panels.

6. A food broiler having a broiling chamber which is closable against the entry of excess air, infra-red heat generating units in said chamber for subjecting meat therein to intense radiant heat so as to cause fat to drip therefrom, said chamber having front and back ends and generally downwardly converging side walls, said ends and walls at their lower ends defining an opening at the bottom of said chamber, a pan having a front and back end, said pan being connected to the bottom of said chamber and over said opening for catching fat dripping from said meat, and means for quickly locking and unlocking said pan over said opening and operable from the front end thereof, said means comprising, interengageable projection and slot elements between and adjacent the rear ends of said chamber and pan and disengageable by rearward shifting of said pan, said means also including a handle swingably mounted on the front end of said pan and having an extension thereon, said handle being swingable from (1) a locking position in which said extension abuts against the front end of said chamber to prevent rearward shifting of said pan and (2) a position in which said extension is free of contact with said chamber to thereby permit rearward shifting of said pan and consequent disengagement of said projection and slot elements; a panel removably positionable over each of said converging side walls and generally co-extensive therewith, said panels adapted to prevent hot fat from falling on said side walls and cause said fat to run in said pan, and bracket means for detachably holding said panels in position over said walls and permitting removal of said panels downwardly through said opening when said pan is removed.

7. A broiler as defined in claim 6 further characterized in that said bracket means is secured to said side walls adjacent the bottom end thereof and said panels can be slipped downwardly therein, said panels adapted to abut against said walls adjacent the upper end of said panels.

References Cited

UNITED STATES PATENTS

| | | | |
|---|---|---|---|
| 1,741,791 | 12/1929 | Reck | 99—400 XR |
| 2,997,941 | 8/1961 | Phelan | 99—400 XR |
| 3,056,344 | 10/1962 | Miller | 99—400 XR |
| 3,267,924 | 8/1966 | Payne | 99—446 XR |

BILLY J. WILHITE, *Primary Examiner.*